United States Patent [19]

Casagrande

[11] 4,158,121
[45] Jun. 12, 1979

[54] SPOT WELDER CONTROL CIRCUIT

[76] Inventor: Serge Casagrande, 1031 Homedale Blvd., Windsor, Ontario, Canada

[21] Appl. No.: 886,108

[22] Filed: Mar. 13, 1978

[51] Int. Cl.² .............................................. B23K 11/24
[52] U.S. Cl. ..................................... 219/114; 219/111
[58] Field of Search ............... 219/108, 111, 114, 115; 323/24; 307/252 P

[56] References Cited

U.S. PATENT DOCUMENTS

| 3,391,331 | 7/1968 | French | 219/108 |
| 3,659,074 | 4/1972 | Friess | 219/111 |
| 3,735,158 | 5/1973 | McDonald | 323/24 |
| 3,917,962 | 11/1975 | Pascente | 323/24 |
| 3,921,058 | 11/1975 | Tanaka et al. | 219/108 |
| 4,006,368 | 2/1977 | Ichikawa | 323/24 |
| 4,049,976 | 9/1977 | Pascente | 323/24 |

FOREIGN PATENT DOCUMENTS 456130 11/1936 United Kingdom ..................... 219/108

Primary Examiner—Bruce A. Reynolds
Assistant Examiner—Clifford C. Shaw
Attorney, Agent, or Firm—Fleit & Jacobson

[57] ABSTRACT

A phase controlled regulating circuit for a portable spot welder having an output transformer, utilizes a normally saturated transistor across one diagonal of a diode bridge circuit to interrupt the connection between the control voltage source and the regulating source, in response to a timer input.

1 Claim, 2 Drawing Figures

SPOT WELDER CONTROL CIRCUIT

This invention relates to a phase controlled regulating circuit for a portable spot welder.

In general the circuit is comprised of solid state devices, and by utilizing inherent characteristics of such devices provides a relatively simple, and reliable means of controlling weld power and time of the portable spot welder.

In summary the portable spot welder has electrodes which are connected across the secondary windings of an output transformer. The primary of the output transformer is connected in series with a source of A.C. power, and a phase controlled regulating circuit. The regulating circuit is joined to a variable phase control voltage source. A timing circuit is used to establish the duration of the energization period of the primary windings, and consequently the weld time. A normally saturated transistor connected across one diagonal of a diode bridge circuit, is responsive to the timer, and serves to interrupt the connection between the control voltage source and the regulating circuit.

The operation of the circuit will become apparent from a reading of the following detailed description, in conjunction with the drawings in which.

Figure 1:
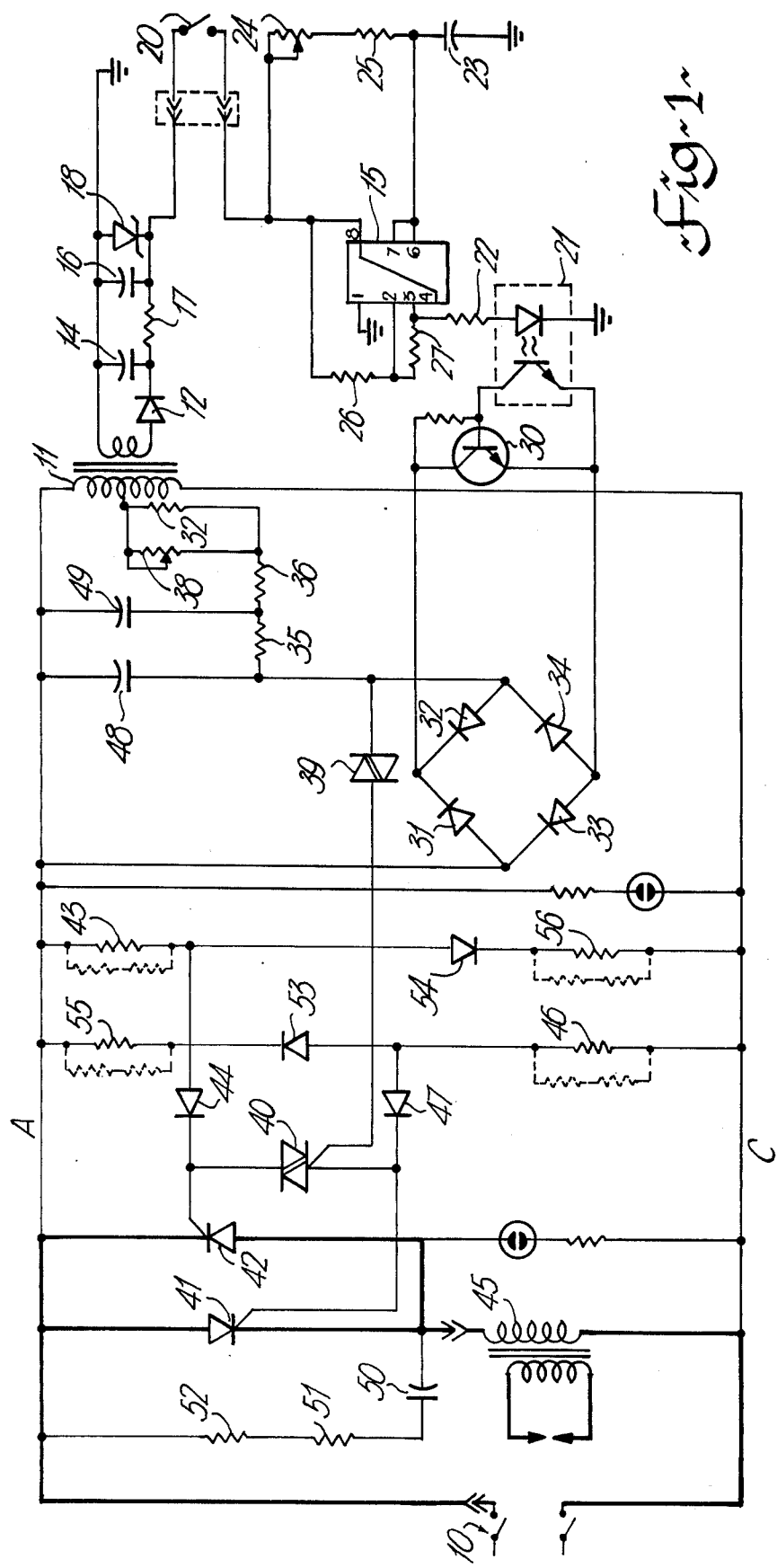
FIG. 1 is a circuit diagram of one embodiment of the invention.

Referring to FIG. 1, the 380 volt input through the on off switch (10) appears across the primary of the input transformer (11). The secondary voltage of the transformer (11), through rectifier (12) and capacitor (14) provides the D.C. voltage for the 555 timer which is integrated circuit (15). The D.C. voltage is further filtered and regulated by the capacitor (16), resistor (17) and Zener diode (18).

Push button switch (20), which is the weld activation switch located on one of the electrode holders, when closed supplies the voltage to pin 8 of the monolithic timing circuit (15). Simultaneously trigger input pin 2 and output pin 3 are raised to a high state which turns on the light emitting diode of the optical isolator (21) through series resistor (22).

The time threshold pin 6 and discharge pin 7 are tied to the same potential which is regulated by capacitor (23) and potentiometer (24) and series resistor (25). When the potential at threshold pin 6 has been raised to the threshold voltage, the 555 timer (15) will switch over returning pin 3 to a low state, and turning off the LED in the optical isolator (21).

The duration of the high state condition at output pin 3, and consequently the on time of the LED is a function of the setting of the potentiometer (24) which is the weld time control of the portable welder.

A unique feature of the timing circuit is the voltage divider biasing network consisting of resistors (26) and (27), connected between the input voltage, and trigger, and between the trigger and output prevent the 555 timer from self triggering at the end of the weld cycle. If, at the end of the timed cycle, the activating switch (20) is in the depressed condition, the trigger voltage at pin 2 is maintained at a high level which in turn ensures that unwanted or inadvertent triggering does not occur.

When the LED in the optical isolator (21) is turned on, the phototransistor portion saturates which drives the collector from a high state to a low state, and allows the transistor (30) to turn off.

Transistor (30) is across the output of the bridge rectifier circuit composed of diodes (31), (32), (33) and (34), and in the "on" condition bypasses the A.C. signal from the center tap of the primary of transformer (11) through resistors (35), (36), (37), and potentiometer (38). The full 380 volt input is not used as this would over drive the components. However, when transistor (30) is in the "off" condition the A.C. signal flows through bilateral trigger diode, diac (39) providing a train of pulses which turn on triac (40), and permits A.C. voltage to appear at the gates of the two S.C.R.'s (41) and (42). When point A is positive with respect to point C, and the triac (40) is turned on current flows through the circuit consisting of resistor (43), diode (44), triac (40) to the gate of S.C.R. (41) thus firing that S.C.R., and energizing the output transformer (45). When point A is negative with respect to point C, current flows through resistor (46), diode (47), and triac (40) to the gate of S.C.R. (42) firing the second S.C.R., and energizing the transformer (45).

An important feature of this embodiment is the two steering diodes (44) and (47). The steering diodes connected in the gate circuits of the S.C.R.'s ensure that only one half cycle of the input signal appears at each gate. In this way the two S.C.R.'s cannot be simultaneously fired, or misfired.

The phase network comprising capacitors (48) and (49), and resistors (35), (36) and (37) together with potentiometer (38) controls the relationship of the voltage, to the gates of the S.C.R.'s with respect to the current through them, and consequently controls the weld power. Potentiometer (38) is the weld power control on the welder chassis.

The circuit consisting of capacitor (50) and resistors (51) and (52) is for arc suppression as well as to help prevent the S.C.R.'s from firing, and staying on. Since triacs have a 600 P.I.V. rating diodes (53) and (54) and resistors (55) and (56) are incorporated in order to reduce the voltage across triac (40) when it is not turned on.

Diodes (53) and (54) are required to ensure that the A.C. signal does not appear at the gates of the S.C.R.'s when triac (40) is not turned on.

Figure 2:
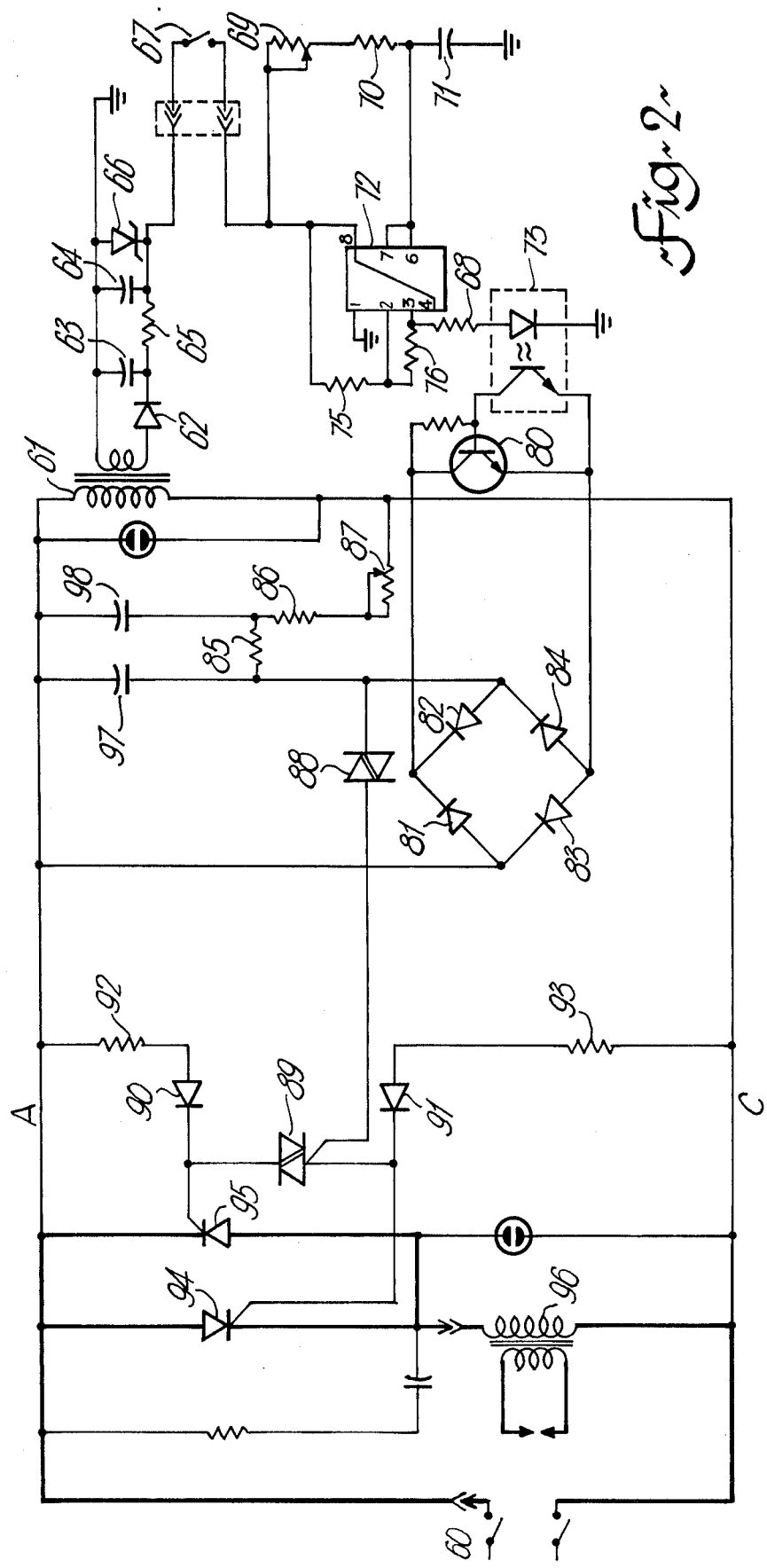
FIG. 2 is a circuit diagram of a second embodiment.

A second embodiment of the invention is shown in FIG. 2 in which the circuit is designed for 230 volt operation. The operation of this circuit is identical to the operation of the 380 v version. Several components may be deleted, however, since voltage rating of the single components are sufficient to operate in the lower voltage circuit.

In operation, the 230 volt input is applied across the primary of the transformer (61) through on off switch (60). In this instance no center tap is employed, since the components are capable of withstanding the full input voltage. The D.C. voltage for the 555 timer (72) is rectified, filtered and regulated by diode (62), capacitors (63) and (64), resistor (65) and Zener diode (66). Activation switch (67) closes the circuit to provide D.C. voltage to pin 8 of the 555 timer. Simultaneously pin 2, the trigger input, and pin 3 the output pin are raised to the high state. The LED in the optical isolator (73) is turned on through series resistor (68). Meanwhile the potential on the threshold pin 6 is allowed to increase as the CR network comprising potentiometer (69), series resistor (70) and capacitor (71). When the potential reaches the threshold voltage the 555 timer switches over, reducing pin 3 to a low state, and the LED in the optical isolator turns off. The length of time required for the threshold voltage to reach the critical value is a function of the values of the capacitor (71) and the total resistance of potentiometer (69) and resistor (70). The weld time may be adjusted by the potentiometer (69), which is the control on the welder chassis. The voltage divider network comprising resistors (75) and (76) as previously described prevents self triggering.

When the LED in the optical isolator is turned on, the phototransistor portion saturates, and drives the collector from a high state to a low state and allows transistor (80) to turn off.

When transistor (80) is in the on condition, the A.C. signal is bypassed through the bridge network comprising diodes (81), (82), (83) and (84) and the primary of transformer (61) as well as resistors (85) and (86), and potentiometer (87). However, when the transistor is in the off condition a train of pulses passes through bilateral diode (88) and turns on the triac (89). The duration of the train of pulses is essentially of the same duration as the off time of transistor (80), which is established by the timing circuit.

When the triac (89) is enabled, the A.C. signal across the S.C.R.'s (94) and (95) and through the steering diodes (90) and (91) via series resistors (92) and (93) sequentially fire the two S.C.R.'s (94) and (95) and provide energizing pulses to the primary of output transformer (96). The secondary of the transformer is coupled to the welding electrodes.

The phase shift circuit comprising capacitors (97) and (98) in conjunction with resistors (85) and (86) and potentiometer (87) establishes the voltage/current relationship and consequently the weld power. Potentiometer (87) provides the external adjustment of the weld power.

I claim:

1. In a spot welder having an output transformer with a primary and a secondary winding, a phase-controlled regulating circuit in series with a source of A.C. power and the primary winding, a control voltage source of variable phase connected to the regulating circuit, a timing circuit establishing a desired period of energization of the primary winding and circuit means responsive to the timing circuit to interrupt the connection between the control voltage source and the regulating circuit, said phase-controlled regulating circuit comprising a parallel arrangement of oppositely poled S.C.R.'s, a triac connected between the gates of the S.C.R.'s and a diac coupling the gate of the triac to the control voltage source, the improvement comprising a gating circuit for each S.C.R. comprising a series arrangement of a diode and a resistor connected across the source of A.C. power, the gate of the respective S.C.R. being connected to the junction of the respective diode and resistor via a further steering diode whereby only one half cycle of the input signal appears at each gate and no A.C. signal appears at the gates when the triac is off.

* * * * *